United States Patent [19]

Blonar

[11] 3,820,809
[45] June 28, 1974

[54] BODY TILTING MECHANISM
[76] Inventor: James A. Blonar, Barrington, Ill.
[22] Filed: June 5, 1972
[21] Appl. No.: 259,499

Related U.S. Application Data
[62] Division of Ser. No. 57,506, July 23, 1970, Pat. No. 3,689,108.

[52] U.S. Cl........... 280/91, 280/96.2, 280/104.5 R, 280/112 A, 280/87 R
[51] Int. Cl............................................. B62d 9/02
[58] Field of Search.......... 280/87 R, 112 A, 104.5, 280/91

[56] References Cited
UNITED STATES PATENTS

| 871,186 | 11/1907 | Rosenzweig | 280/112 A |
|---|---|---|---|
| 2,165,617 | 7/1939 | De Oliveira Paes et al. | 280/87 R X |
| 2,260,102 | 10/1941 | Fréret | 280/87 R X |
| 2,609,884 | 9/1952 | De Montalvo et al. | 280/112 A X |
| 3,008,729 | 11/1961 | Müller et al. | 280/112 A |
| 3,074,735 | 1/1963 | Ulrich | 280/96 |
| 3,083,027 | 3/1963 | Lindblom | 280/112 A X |
| 3,089,710 | 5/1963 | Fiala | 280/112 A |
| 3,633,933 | 1/1972 | Millard | 280/96 |

*Primary Examiner*—David Schonberg
*Assistant Examiner*—John P. Silverstrim
*Attorney, Agent, or Firm*—Hill, Gross, Simpson, Van Santen, Steadman, Chiara & Simpson

[57] ABSTRACT

External forces acting upon a vehicle during movement along a curve or turn are counteracted and provide body banking by a body tilting or banking mechanism comprising a means for counteracting the external tipping forces which means may include an inclined plane, or matching inclined plane members having a common axis so that movement of one with respect to the other will cause a tilt of the vehicle in the direction opposite that caused by the external tilting force. This means may be conveniently positioned and, for example, connected with the steering control of a vehicle or in a hinged vehicle such as a semi-trailer, it may be made a part of the interchange coupling between tractor and trailer. The means may include an inclined plane bearing against a movable axle means and may take the form of a hydraulic means operated off of a master cylinder.

2 Claims, 7 Drawing Figures

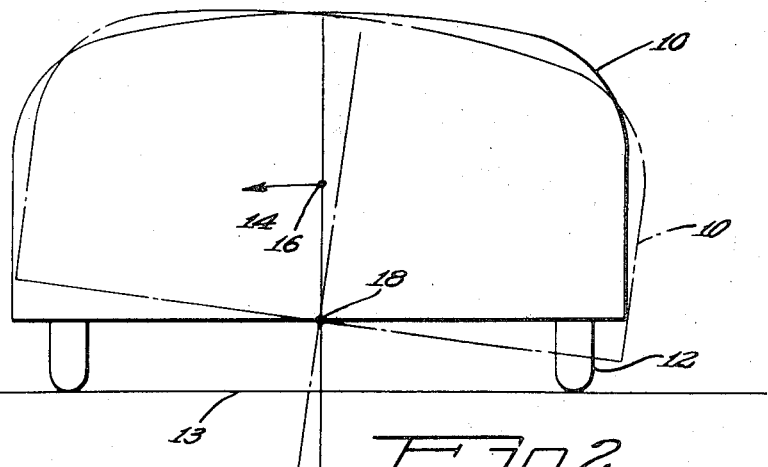
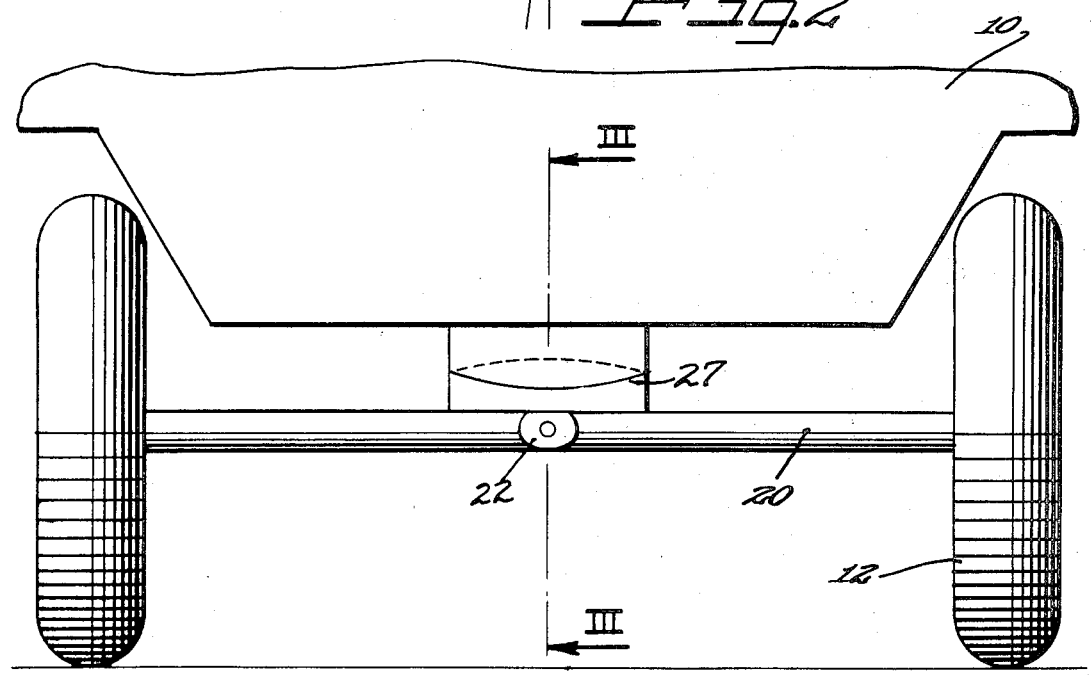
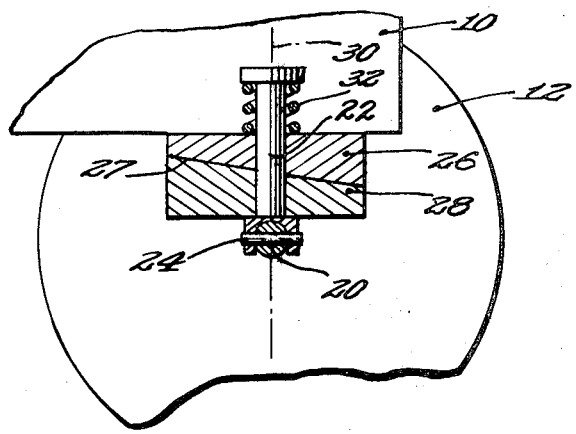

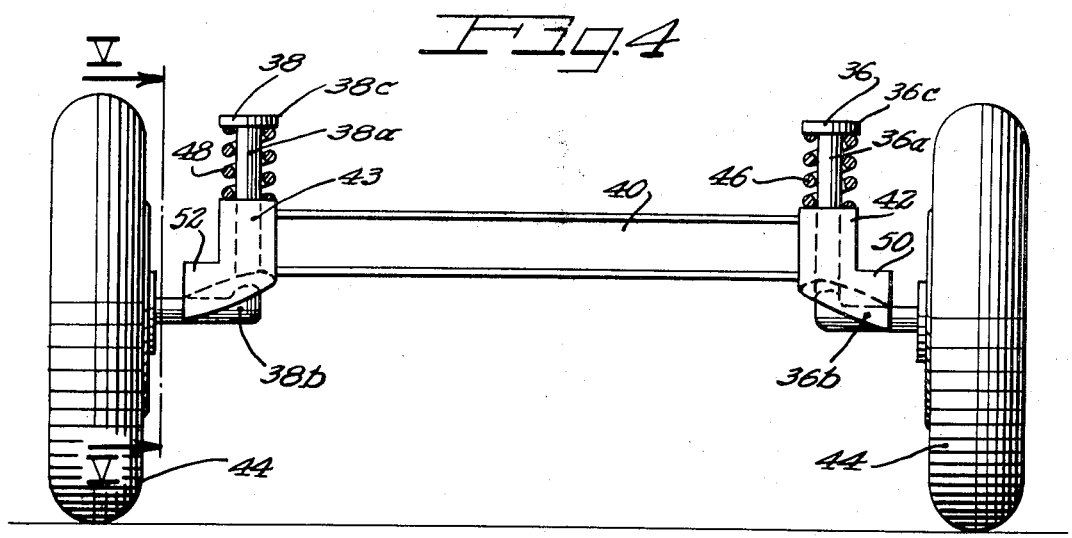
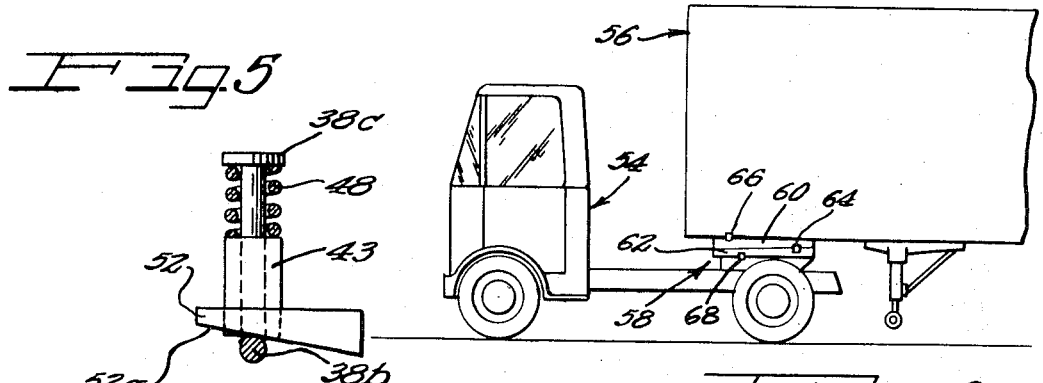
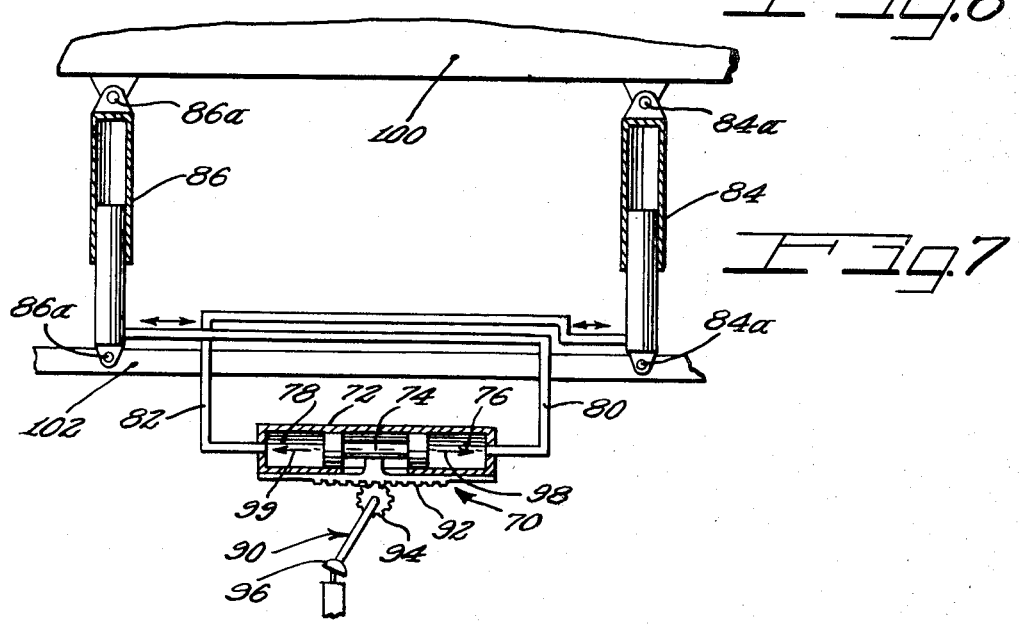

BODY TILTING MECHANISM

This is a division, of application Ser. No. 57,506 filed July 23, 1970, now U.S. Pat. No. 3,689,108.

BACKGROUND OF THE INVENTION

1. Field of the Invention

This invention generally relates to a system for controlling the movement of a vehicle and more particularly contemplates a variable means to counteract the tilting or tipping forced on a vehicle and provide body banking for improved cornering.

2. Prior Art

The tipping or tilting forces caused by gravity and lateral acceleration during the turning of a vehicle in normal operation must be effectively controlled for safe vehicle operation. In the past this tipping or tilting has been controlled by vehicle levelling suspension to maintain level only by systems such as mechanical roll or anti-sway bars or by complex hydraulic systems. Each of these prior art attempts to counteract the tipping or tilting forces is relatively complex and/or is not directly related to the steering control function of the vehicle or apparatus. Thus, the prior art includes devices which call for a complex system of electrical circuits and switches responsive to the external forces and do not bank beyond level. These systems are relatively expensive and often difficult to maintain in proper operating order.

SUMMARY OF THE INVENTION

Accordingly, it is an object of the present invention to overcome the disadvantages of the prior art by providing a simple, sturdy and positive variable vehicle tilt control means which will counteract the tipping or tilting forces which occur during normal vehicle operation and provide body banking for improved cornering ability with an increase of safety. It is my discovery that inasmuch as the external tilting or tipping forces occur during the turning of a vehicle in response to a curve or turn that a system functioning in relation to the steering or direction control mechanism of the vehicle will perform very well in normal operation.

According to my invention the mechanism which overcomes the disadvantages of the prior art comprises a means for counteracting the tipping or tilting forces and provide body banking on a vehicle that may include matching flat inclined plane members which may have a flexible common axis with limited vertical movement whereby movement of each about the axis relative to the other will cause a tilt of the vehicle in the direction opposite to that to which the vehicle would tend to tilt or tip when it is turned in normal operation. As embodied on a vehicle my invention may include a first inclined plane means mounted on the underside of a vehicle and a second inclined plane means connected with a steerable axle wherein the first and second inclined plane means rotate about a flexible common axis and wherein the vehicle is supported at least in part on the first inclined plane so that turning movement of the axle causes the vehicle to tilt. The first and second inclined plane members rotate about a flexible pivot axis member which is generally vertically inclined. During rotation the inclined plane members engage each other along common surfaces. The inclined plane means may be positioned centrally on a centrally pivoted swinging axle or may be positioned adjacent stub axles. In the latter case at least a portion of the vehicle is supported on inclined plane means which are positioned above each of the steerable stub axles whereby movement of the stub axles is against the inclined plane and thereby tilts or tips the vehicle by raising one side and lowering the other. In this case the movable stub axle means may include a generally right angular member having an upstanding first portion projecting through and beyond a support means on the vehicle and a second portion projecting generally horizontally with the first portion having a resilient means connected therewith in shock absorbing relation thereto and the second portions each having a wheel means attached thereto.

My invention may be applied to hinged vehicles such as semitrailers by inclusion of the pair of matching inclined planes on the semitrailer interchange coupling whereby as the tractor and trailer move relative to one another the trailer is tilted to compensate for the external tilting or tipping forces. It is recognized that in situations such as with the semitrailer there will occur situations such as backing the trailer into an unloading dock in which the tip compensating arrangement will be unnecessary or undesirable and hence it is within the contemplation of my invention that a clutching arrangement may be provided whereby the upper first and lower second inclined planes may be locked together and unlocked from either the tractor or the trailer to allow movement therebetween in a conventional manner. Thus, a first lock means may lock the upper inclined plane means to second inclined plane means so that they move together and second and/or third plane means positioned respectively between the first inclined plane means and the trailer and between the second inclined plane means and the tractor may be unlocked to allow relative movement between the tractor and the trailer in a conventional manner.

My invention further includes an improved hydraulic tilt counteracting system comprising a fluid pressure means having a master cylinder, master piston centrally located in said cylinder with the piston means being movable by a rack and pinion means directly from a steering control to thereby cause the piston to force fluid into and out of piston-cylinder means interposed between the vehicle and its undercarriage adjacent some or all or the wheel means.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a schematic cross sectional view of a typical vehicle on a road bed illustrating the tilt which may be effected by my invention to counteract external tipping forces and provide body banking;

FIG. 2 is a schematic cross sectional view of a portion of a vehicle illustrating the application of my invention to a swinging axle;

FIG. 3 is a cross sectional view taken along the lines III—III of FIG. 2 illustrating the interposition of the inclined planes between the vehicle body and the supporting axle;

FIG. 4 is a schematic cross sectional elevational view illustrating the application of my invention to a stub axle arrangement;

FIG. 5 is a view taken along the lines V—V of FIG. 4 illustrating the relationship of the inclined plane to the axle;

FIG. 6 is a schematic view illustrating the application of my invention to the interchange coupling between a tractor trailer vehicle; and FIG. 7 is a schematic cross sectional view of my invention in an improved hydraulic tilt control system.

DESCRIPTION OF THE PREFERRED EMBODIMENT

Referring to FIG. 1 there may be seen a schematic illustration of a vehicle 10 supported on wheel means 12 traveling on a generally horizontal road bed 13. When the vehicle 10 moves into a curve or turn under normal driving speeds a lateral centrifugal force indicated by the arrow 14 acts through the vehicle center of gravity 16 to cause the vehicle 10 to tip or tilt in the direction of the arrow 14 about the center of tilt 18. This produces undesirable and unsafe driving conditions and therefore must be counteracted. According to my invention the centrifugal force as represented by the arrow 14 may be counteracted by tilting of the vehicle 10 about the point of tilt 18 in a direction opposite that of the arrow 14 in varying degrees depending upon the magnitude of the force 14. Inasmuch as the magnitude of the force 14 is generally proportional to the length of the radius of the curve through which the vehicle is turning it is my idea to have the vehicle 10 assume a tilted position indicated by the dotted lines such that the tilt will be sufficient to offset and counteract the centrifugal force 14.

The counteracting tilting of the vehicle 10 is accomplished according to my invention in several different ways. Thus, in FIG. 2 the vehicle 10 is shown supported on a wheel means 12 having a swingable axle 20. In this case the vehicle 10 is schematically illustrated as having a kingpin 22 depending therefrom and being connected to the axle 20 by suitable means 24 as may be best seen in FIG. 3. Interposed between the axle 20 and the vehicle 10 are a pair of inclined plane means including a first inclined plane 26 and a second inclined plane 28. The first inclined plane 26 will be affixed to the vehicle 10 and the second inclined plane 28 will be connected with the axle means 20 so that the inclined plane means 26 and 28 may turn relative to each other about the flexible kingpin 22 on a common turning plane 27. The flexible pivot axis member 22 allows the first and second inclined plane members 26, 28, respectively, to engage each other along the common surface 27 as they rotate. In such case it may be seen that as the axle means 20 swings relative to the body 10 that the body will tilt to a degree varying with the angle through which they are moved relative to each other. Accordingly, the sharper the curve through which the vehicle passes the greater will be the angle of tilt of the vehicle in response to the proportionately greater tipping force 14.

It will be understood by those skilled in the art that I have only illustrated a schematic adaptation of my invention and that many changes and modifications may be made within the scope of my invention. Thus, the inclined plane means 26 and 28 may actually be below the axle means 20. Also, the kingpin 22 may have suitable resilient shock absorbing means 32 connected therewith.

In FIG. 4 there may be seen a further adaptation of my invention wherein a pair of stub axles 36 and 38 are shown as part of a vehicle support-axle means 40.

The movable stub axle means 36 and 38 may advantageously take the form of a generally right angular member having a first upstanding portion 36a, 38a projecting through and beyond a support means 42, 43 on the opposite ends of the vehicle support-axle means 40. A second portion 36b, 38b projects generally horizontally outwardly from the support means 40 and has an axle (ski or skids could be used) means generally indicated at 44 attached thereto by suitable means. A resilient means 46, 48 for allowing tilting may be provided for each stub axle and retained between an upper portion 36c, 38c and the support means 42, 43. An inclined plane means 50, 52 is affixed to the support means 40 and particularly the end portions 42, 43 respectively, in such a position so that, as may be seen in FIG. 5, the lower inclined plane surface 52a bears against the axle 38b. In this construction as the stub axle portion 38b is turned by suitable steering control means (not shown) it will ride along the inclined surface 52a as shown in FIG. 5 to raise and lower the supported body. With the axle means 44 as shown in FIG. 4 being turned together this will mean that one side of the body is lowered if, as shown in FIG. 5, the axle 38b moves to the right and the other side raised if the axle 38b moves to the left. Here again it may be seen that the greater the turning movement of the stub axles 36b, 38b, the greater will be the tilting of the body to counteract the expected greater tipping or tilting force suggested by the arrow 14 in FIG. 1.

FIG. 6 illustrates the embodiment of my invention as applied to a hinged vehicle such as a semi-trailer by inclusion of a pair of matching planes on the semi-trailer interchange coupling whereby as the tractor and trailer move relative to one another, the trailer is tilted to compensate for the external tilting or tipping forces. The same principle would apply as were explained with regard to FIGS. 2 and 3. Thus, a tractor generally indicated at 54 will have a trailer generally indicated at 56 connected therewith by a means of interchange coupling generally indicated at 58. The interchange coupling 58 will include a first upper inclined plane means 60 and a second lower inclined plane means 62. The trailer 56 will pivot about the tractor 54 in a manner similar to the way the vehicle body 10 in FIG. 3 pivots about the axle means 20 so that this explanation will not be duplicated.

It is recognized that in situations such as with the semi-trailer there will occur situations in which the tip compensating arrangement will be unnecessary or undesirable and hence it is within the contemplation of my invention that a clutching arrangement may be provided whereby the upper first inclined plane 60 and the lower inclined plane 62 may be locked together by a first lock means 64. In such case either or both of the inclined plane means would be constructed to be able to move relative to their adjacent vehicle portion to allow movement therebetween. Thus, the upper inclined plane 60 could be locked to the trailer body 56 by a second lock means 66 and the lower inclined plane means 62 could be locked or unlocked from the tractor 54 whereby the movement between the tractor 54 and the trailer 56 would be in a conventional manner on a horizontal plane.

Referring to FIG. 7 it will be seen that my invention further includes a hydraulic tilt and body banking system comprising a fluid pressure means generally indicated at 70 including a master cylinder 72 within which there is received a master piston 74 centrally located to create a first fluid chamber 76 and a second fluid chamber 78. Each of the master cylinder fluid chambers 76 and 78 are connected by suitable fluid conveying means 80 and 82 to respective pressure cylinder means 84, 86 in a fluid-tight hydraulic system. The master piston 74 is conveniently connected with a steering control system generally indicated at 90 so that movement of the steering control system 90 is transmitted to the master piston 74 thereby increasing or decreasing the size of the chamber 76, 78 and in turn enlarging or decreasing the piston cylinder means 84, 86 so that the vehicle generally indicated at 100 is tilted. The piston arrangement 84, 86 is conveniently pivotally mounted at each end between the body means 100 and the support means 102. In practice I have found it advantageous to move the piston means 74 by a rack and pinion means 92, 94 respectively. It may be seen that as the steering control linkage means 96 moves in response to turning of the control means 90 that the pinion 94 will be pivotally mounted in fixed relation to the master cylinder and will move the rack 92 in the directions indicated by the arrows 98, 99 to thereby increase and decrease the size of the chamber 76, 78 whereby, for example, if the chamber 76 is decreased in size the fluid will be forced through the conduit means 80 into the fluid cylinder means 86 to elongate it and raise the body means 100 at that point. Contrarily, as the chamber 78 is enlarged in size, fluid in the piston-cylinder means 84 will be forced by the compression forces thereon through the tube means 82 into the chamber 78 whereby the length of the chamber will be decreased and the body will tilt in that direction. In this manner, it may be seen that as the vehicle is turned the body means 100 will tilt or bank proportionately and in substantially direct relation thereto. It must be understood, however, that it is within the contemplation of my invention to provide a variable ratio means whereby the ratio of the movement of the steering control means 90 to the movement of the master piston 74 and indirectly the body means 100 will be in a geometric ratio rather than a straight arithmetic ratio.

From the above description of my invention it may be seen that I have overcome the disadvantages of the prior art by providing a simple, sturdy and positive vehicle tilt control and banking means which will counteract the tipping or tilting forces which occur during vehicle operation.

Although minor modifications might be suggested by those versed in the art, it should be understood that I wish to embody within the scope of the patent warranted hereon all such modifications as reasonably and properly come within the scope of my contribution to the art.

I claim as my invention:

1. In a self-contained body banking mechanism for a steerable vehicle under direct control of the steering linkage for the vehicle, the vehicle having a body including a frame, front steering wheels and rear traction wheels and axles therefor supporting said frame and body, individual cylinders and pistons longitudinally pivoted on said front and rear axles and supporting opposite sides of said frame on said axles, fluid pressure means maintaining fluid under pressure in said individual cylinders and pistons and supplying fluid under pressure to said individual cylinders and pistons associated with said front and rear axles on one side of the body and releasing fluid under pressure from the cylinders and pistons on the opposite side of the body, comprising at least one double-acting master cylinder having a double-acting piston therein and fluid connections from opposite ends of said master cylinder to respective ones of said cylinders and pistons at opposite sides of the vehicle, a direct mechanical connection from said steering linkage to said double-acting piston for effecting movement of said piston along its cylinder to supply fluid under pressure to said cylinders on one side of the body and release fluid under pressure from said cylinders at the opposite side of the body comprising a rack rectilinearly guided along the outside of said master cylinder for movement along the axis thereof, pinion means meshing with said rack and directly operated by said steering means and a positive connection from said rack to said double-acting piston to move said piston along said master cylinder upon turning a corner to effect vertical movement of the body relative to each wheel and axle in general vertical directions and tilt the vehicle body to bank the body in direct relation with respect to turning.

2. The vehicle tilting and banking mechanism of claim 1, wherein an individual master cylinder and double-acting piston is provided for each axle, and wherein said pistons are directly operated in accordance with steering through individual rack and pinion means.

* * * * *